Oct. 12, 1937.  C. J. KESTI ET AL  2,095,504
FISH SCREEN
Filed May 14, 1935
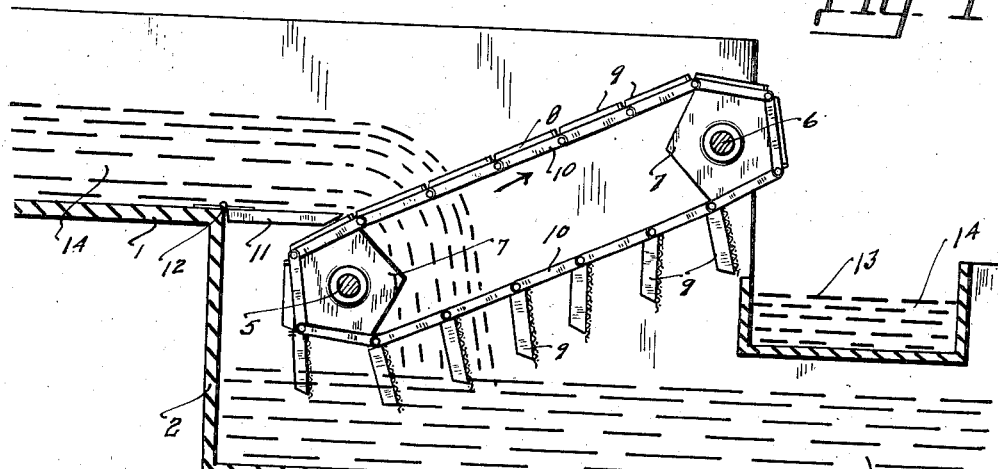
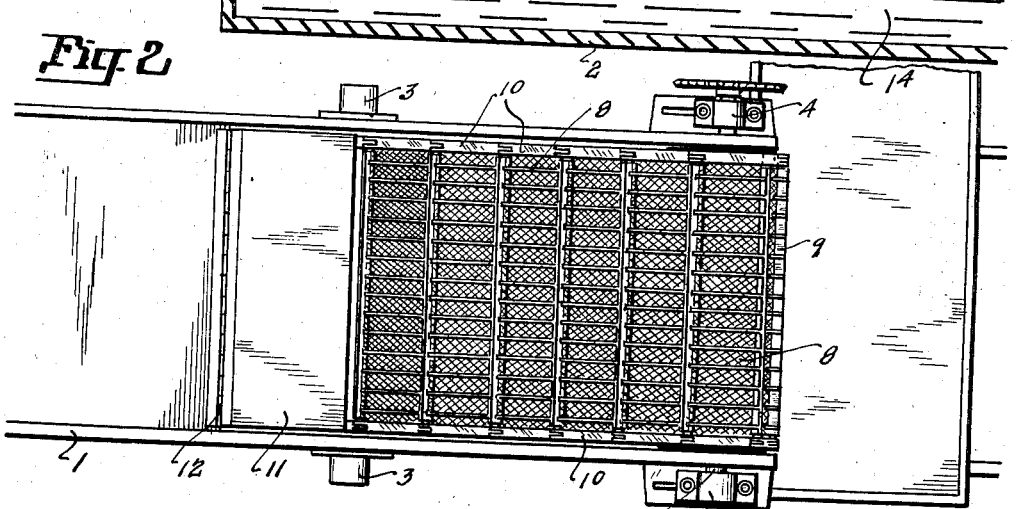
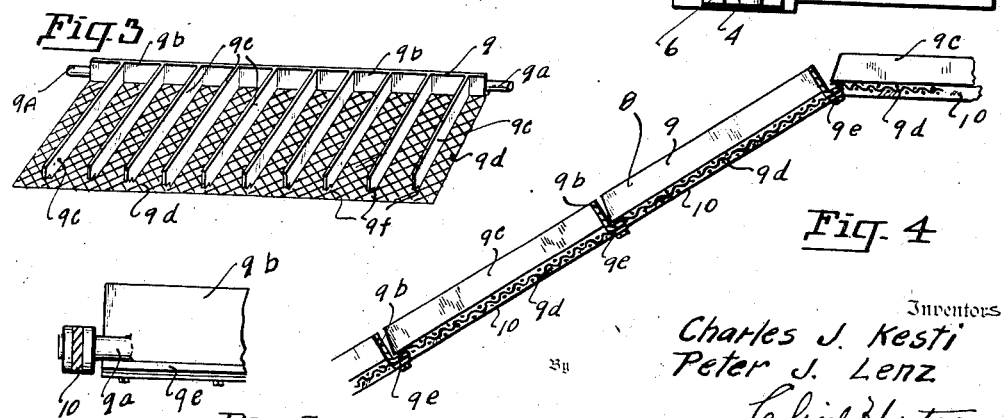
Inventors
Charles J. Kesti
Peter J. Lenz Patented Oct. 12, 1937

2,095,504

UNITED STATES PATENT OFFICE 2,095,504

FISH SCREEN

Charles J. Kesti and Peter J. Lenz, Hood River, Oreg.

Application May 14, 1935, Serial No. 21,314

3 Claims. (Cl. 210—176)

Our invention relates to means to be placed in waterways which operate to prevent the entrance of fish in such waterway to a channel leading therefrom. The invention is chiefly concerned with a device to prevent fish from passing from a major waterway, such as a creek or river, into a lateral waterway, such as an irrigation ditch or similar channel. The invention in fundamental form consists of a screen element closing the lateral waterway and preventing the entrance of fish thereto. However in view of the fact that refuse floating in the major waterway has a tendency to clog the screen, the present invention has incorporated therein means for rendering the screen, or screen elements in this instance, self cleaning.

This is accomplished by making the screen in the form of a continuously moving body, arranged in hinged sections. These sections travel in an endless path and upon the upstream side present a closed perforate body preventing the entrance of fish to the lateral waterway. In addition thereto, by reason of its continuous movement, it carries the collecting rubbish aside and discharges it either into the main stream below the screen or into a lateral disposal stream.

The hinged sections on the down stream side open out thus allowing any accumulations within the screen body to escape down stream. These accumulations are usually fine particles of rubbish which one way or another accumulate within the screen.

In addition to the foregoing, which present an outline of the present invention, there is provided a construction aiding in the disposal of large débris, such as logs, tree limbs, large pieces of wood and so forth. In this construction the screen is arranged to interfere with the continued passage of fish and to present an obstruction to floating débris, and to furthermore to act as a conveyor raising the débris from the stream and depositing it in a place of discharge.

A more complete understanding of the invention, its additional objects and purposes will be obtained upon reading the following description thereof, aided by the several views of it in the accompanying drawing, wherein—

Figure 1 is a side elevation of the invention with parts of associated elements in section. This view shows the invention being employed to check the travel of fish in a lateral waterway, such as an irrigation ditch.

Figure 2 is a plan of the invention shown in the preceding figure.

Figure 3 is a perspective of one of the screen sections.

Figure 4 is a sectional side elevation of a portion of the screen element, and illustrates the hinging of the sections composing the screen body in its entirety.

Figure 5 is an enlarged fragmentary end elevation of one of the sections. This view illustrates the hinging or pivotal connection between related sections.

In the drawing, 1 indicates a flume or waterway having a downward offset or drop 2 providing for a change of level and for the mounting of the present invention.

Secured to the opposite walls of the flume are bearings 3 and 4 seating shafts 5 and 6. Upon the shafts are mounted the multisided rolls or sprockets 7. Trained about the sprockets is an endless screen member 8 formed of a plurality of pivotally supported sections 9, the sections being supported by an endless chain 10 at each side. The two chains consist of a number of links having joining ends held in pivotal relationship by means of the pins 9a projecting from the cross bar 9b. Cross bar 9b supports a number of spaced longitudinal bars or grates 9c and together carry the screen elements 9d. The screen elements are rectangular screen sections extending from side to side of the entire assembly and the flume, and end to end with regard to each other. It will be noticed on examination of Figure 1 that the screen sections 9 pivot outwardly, but are prohibited from doing so inwardly by reason of the fact that the unattached ends of the members 9c rest upon the ledge 9e of the cross members 9b, the members 9c being notched at 9f to provide a seat for resting on such ledge. Examination of Figure 1 will show that shaft 5 is somewhat below the level of the bottom of flume 1, while shaft 6 is above the bottom level and that the endless screen member 8 is at an upward inclination. The lower end of the screen is spaced somewhat away from the wall of the flume, and in order not to leave an opening therethrough for the passage of fish a member is provided which is in the nature of a swinging gate or bottom extension to flume 1. This member is indicated by the numeral 11 and is pivotally supported along one edge by means of the pivot support members 12 to the bottom of flume 1, and its opposite edge rests upon the lower end of the screen member 8.

The shafts 5 and 6 are rotated by suitable means, not shown, which may be a water operated motor, and the screen is caused to travel in the direction indicated by the arrow. Fish upon engaging the screen elements 9d are turned back. When rubbish and débris collect upon the screen sections, they are carried to the uppermost portion of the member 8 and deposited in the lateral channel 13 which carries it away. The dash lines 14 represent the water in the various channels and indicates the passage thereof through the screen member. As the screen travels the upper side is constantly closed to the movement of fish, while on the opposite or under side the sections open out allowing matter such as débris, which may pass through the interstices of the screen and at the edges of the apparatus, to escape.

In some locations there may be an accumulation of large floating objects in the streams, especially during high water seasons, such as logs, limbs of trees, and so forth. Ordinarily these are liable to damage fish screens. However in the construction presented here, the danger of damage to the screen members is substantially eliminated, this by reason of the fact that the grates 9c will adequately protect the screen elements 9d from injury and will carry these objects to and discharge them into the lateral channel 13.

While a specific form of the improvement has been described and illustrated herein, it is desired to be understood that the same may be varied, within the scope of the appended claims, without departing from the spirit of the invention.

Having described our invention, we claim—

1. In a fish screen embodying endless chains and screen sections carried thereby, the construction of the individual sections comprising a cross member having its ends pivotally connected to the chains, a plurality of members arranged at right angles to the cross member and each having a corresponding end secured thereto, and a screen member secured to the underside of the last mentioned members and the cross member.

2. In a fish screen embodying endless chains and screen sections carried thereby, the construction of the individual sections comprising a cross member having its ends pivotally connected to the chains, a plurality of spaced longitudinal members each having a corresponding end secured to the cross member, a screen member secured to the underside of the cross member and longitudinal members, and a ledge on the cross member seating the free end of a preceding screen section.

3. In a fish screen embodying endless chains and screen sections carried thereby, the construction of the individual sections comprising a cross member having its ends pivotally connected to the chains, a plurality of spaced longitudinal members each having a corresponding end secured to the cross member, a screen member secured to the underside of the cross and longitudinal members, a ledge on the cross member to seat the free end of the succeeding section, and the free ends of the longitudinal members having portions cut out to provide seats for seating upon the aforesaid ledges of succeeding members.

CHARLES J. KESTI.
PETER J. LENZ.